(12) United States Patent
Anand et al.

(10) Patent No.: US 9,074,487 B2
(45) Date of Patent: Jul. 7, 2015

(54) SELF-LUBRICATING BRUSH SEAL ASSEMBLY AND METHOD OF REDUCING LEAKAGE

(75) Inventors: Krishnamurthy Anand, Bangalore (IN); Surinder Singh Pabla, Greer, SC (US); Sundar Amancherla, Bangalore (IN); Paul Mathew, Bangalore (IN)

(73) Assignee: General Electric Company, Schenectady, NY (US)

( * ) Notice: Subject to any disclaimer, the term of this patent is extended or adjusted under 35 U.S.C. 154(b) by 709 days.

(21) Appl. No.: 13/211,473

(22) Filed: Aug. 17, 2011

(65) Prior Publication Data

US 2013/0042456 A1 Feb. 21, 2013

(51) Int. Cl.
*F01D 11/00* (2006.01)
*F16J 15/32* (2006.01)

(52) U.S. Cl.
CPC ......... *F01D 11/005* (2013.01); *Y10T 29/49826* (2015.01); *F16J 15/3288* (2013.01)

(58) Field of Classification Search
CPC ....... F01D 11/005; F01D 11/02; F01D 11/01; F01D 25/183
USPC ......... 277/355; 415/111, 168.2, 170.1, 171.1, 415/173.2, 173.3, 229, 230
See application file for complete search history.

(56) References Cited

U.S. PATENT DOCUMENTS

| | | | |
|---|---|---|---|
| 2,682,734 A * | 7/1954 | Peterson | 15/230.16 |
| 2,878,048 A * | 3/1959 | Peterson | 277/355 |
| 4,600,202 A * | 7/1986 | Schaeffler et al. | 277/355 |
| 5,090,710 A | 2/1992 | Flower | |
| 5,474,305 A | 12/1995 | Flower | |
| 5,480,165 A | 1/1996 | Flower | |
| 6,045,134 A | 4/2000 | Turnquist et al. | |
| 6,053,699 A | 4/2000 | Turnquist et al. | |
| 6,105,967 A | 8/2000 | Turnquist et al. | |

(Continued)

FOREIGN PATENT DOCUMENTS

| | | |
|---|---|---|
| DE | 1245661 B | 7/1967 |
| EP | 1203905 A2 | 5/2002 |

(Continued)

OTHER PUBLICATIONS

Search Report and Written Opinion from corresponding EP Application No. 12179657.7-2421 dated Dec. 20, 2012.

(Continued)

*Primary Examiner* — Edward Look
*Assistant Examiner* — Christopher J Hargitt
(74) *Attorney, Agent, or Firm* — McNees Wallace & Nurick LLC

(57) ABSTRACT

A self-lubricating brush seal assembly, for a power generation system and method of reducing air leakage in a power generation system including a plurality of self-lubricating members is provided. The plurality of self-lubricating members include a plurality of self-lubricating bristles, a plurality of cores sheathed in a self-lubricating braid, a plurality of cores having an outer diameter coated with self-lubricating material and a solid lubricating pack. The lubricating material is selected from graphite, hexagonal-boron nitrite (hBN), molybdenum disulfide ($MoS_2$), tungsten disulfide ($WS_2$), titanium nitride (TiN), titanium aluminum nitride (TiAlN), titanium carbonitride (TiCN), and combinations thereof.

19 Claims, 4 Drawing Sheets

(56) References Cited

U.S. PATENT DOCUMENTS

| | | | |
|---|---|---|---|
| 6,131,910 | A | 10/2000 | Bagepalli et al. |
| 6,260,269 | B1 | 7/2001 | Turnquist et al. |
| 6,308,958 | B1 | 10/2001 | Turnquist et al. |
| 6,772,482 | B2 | 8/2004 | Crudgington et al. |
| 6,799,766 | B2 | 10/2004 | Crudgington et al. |
| 7,644,928 | B2 | 1/2010 | Beichl et al. |
| 7,653,993 | B2 | 2/2010 | Couture et al. |
| 7,744,093 | B2 | 6/2010 | McMillan |
| 7,883,315 | B2 | 2/2011 | Suciu et al. |
| 2004/0256807 | A1* | 12/2004 | Bhate et al. ............ 277/355 |
| 2008/0284107 | A1* | 11/2008 | Flaherty et al. ........ 277/355 |
| 2009/0072486 | A1* | 3/2009 | Datta ...................... 277/355 |
| 2010/0135607 | A1 | 6/2010 | Rogall et al. |

FOREIGN PATENT DOCUMENTS

| | | |
|---|---|---|
| WO | 0212759 A2 | 2/2002 |
| WO | 0223069 A2 | 3/2002 |
| WO | 2012082805 A2 | 6/2012 |

OTHER PUBLICATIONS

N. Turnquies and R. Chupp, "Brush Seals for Improved Steam Turbine Performance", NASA/CP (http://ntrs.nasa.gov/archive/nasa/casi.ntrs.nasa.gov/20070002978_2007002985.pdf), 2006, 214383, vol. 1.

E. Sulda, "Brushing Up on Brush Seals", (http://www.pennenergy.com/index/power/display/3881797178/articles/power-engineering/volume-114/Issue_5/Features/Brushing_Up_on_Brush_Seals.html), pp. 1-6.

B. Gans, "Retrofitting with brush seals", Turbomachinery International (http://findarticles.com/p/adicles/mi_qa5385/is_200709/ai_n21297953/), Sep./Oct. 2007, pp. 1-3.

M. Scotetz and R. Williams, "Industrial Steam Turbine Value Packages",GE Energy, Jan. 2008, pp. 18-19.

D. J. Taylor & O. Crabos, Uprate Options for the MS6001 Heavy Duty Gas Turbine, GE Power Systems (GER-4217A), Dec. 2003, pp. 17-18.

"Haynes Corrision-Resistant Alloys", http://www.hpalloy.com/alloys/descriptios/HAYNES25.html, 2001, pp. 1-5 & 1-7.

* cited by examiner

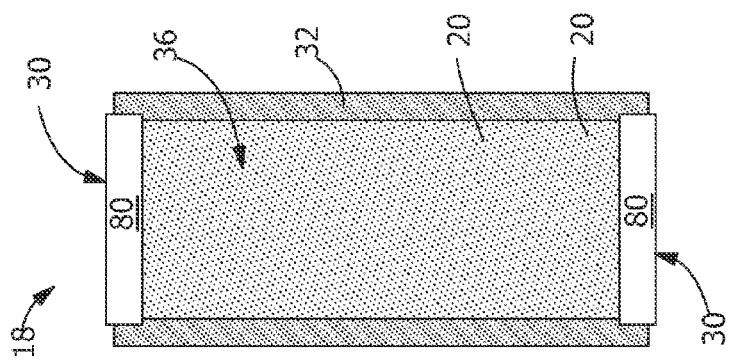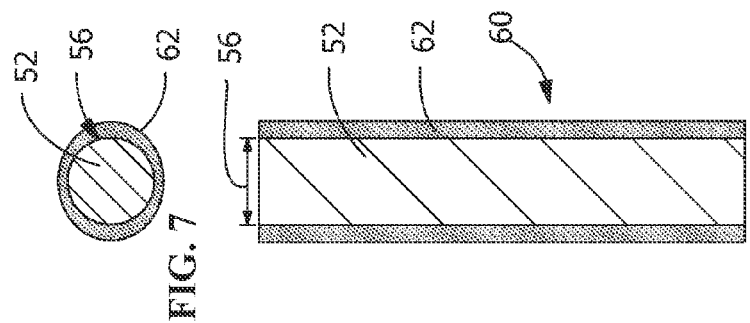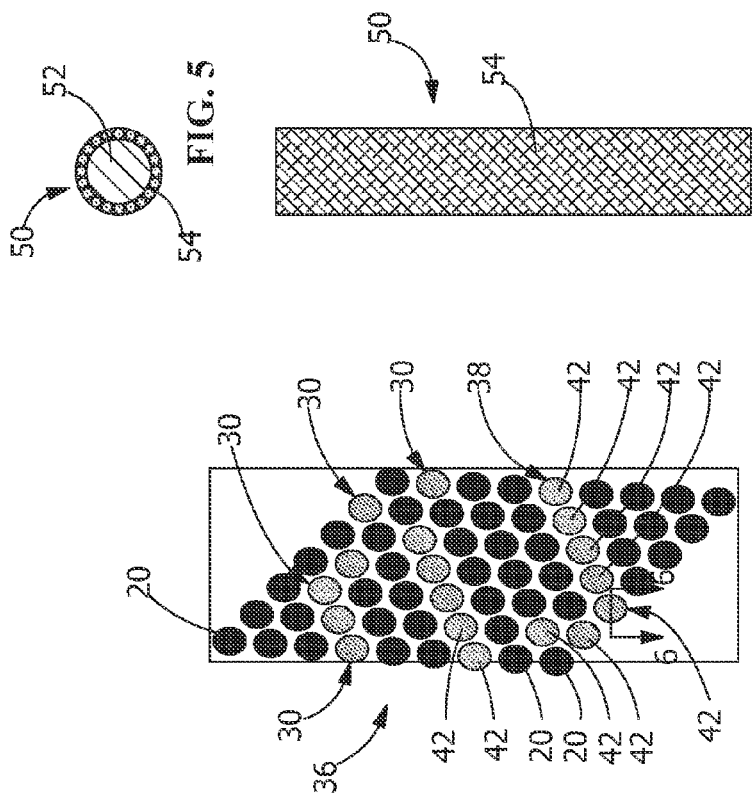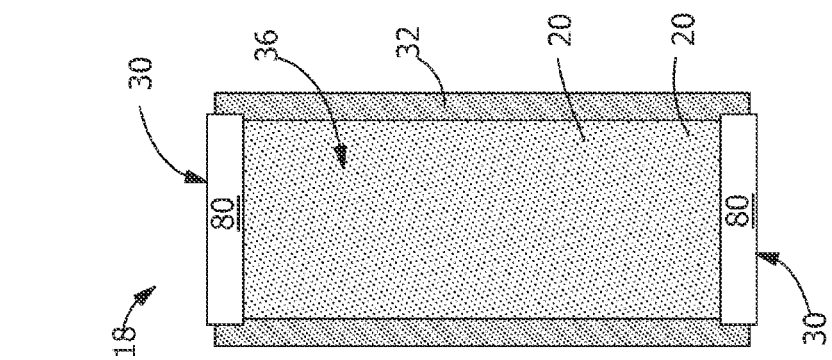

SELF-LUBRICATING BRUSH SEAL ASSEMBLY AND METHOD OF REDUCING LEAKAGE

FIELD OF THE INVENTION

The present invention relates generally to power generation systems, and more specifically to self-lubricating brush seals that provide improved wear properties which maintain the sealing system in the power generation system.

BACKGROUND OF THE INVENTION

Brush seals are typically employed for sealing between stationary and rotary components, e.g. packing about a rotary shaft in a power generation system, such as but not limited to gas turbines and steam turbines, and between high and low pressure regions on opposite sides of the seal. Conventional bristle packs particularly in high temperature environments require precise placement of super alloy bristles while maintaining tight tolerances.

Metallic brush seals in contact against uncoated rotors undergo severe wear if the rotor incursions are beyond 20 mils. Uncoated rotors undergo wear, generate a rough surface, and in turn cause more wear on the bristles in the brush assembly.

In the past, hard smooth wear resistant coatings such as $CrC$—$NiCr$ or $CrC$—$NiCr$—$Ag$—$CaF_2BaF_2$ have been applied to rotors to address the wear on the bristles in the brush assembly. The hard smooth wear resistant coatings polish the bristles instead of wearing away the bristles. When working with brush seal assembly wear issues in the field, an entire rotor in a gas turbine or steam turbine would have to be removed and brought in to a shop to re-apply the wear resistant coatings. Additionally, accommodating large rotors in a small spray cell to apply the wear resistant coatings may pose significant difficulties.

Therefore, a self-lubricating brush seal assembly and a method of reducing air leakage in a power generation system that do not suffer from the above drawbacks is desirable in the art.

SUMMARY OF THE INVENTION

According to an exemplary embodiment of the present disclosure, a self-lubricating brush seal assembly comprising a plurality of self-lubricating members is provided.

According to another exemplary embodiment of the present disclosure, a power generation system including a self-lubricating brush seal assembly in contact with a component of a power generation system is provided. The self-lubricating brush seal assembly includes a plurality of self-lubricating members.

According to another exemplary embodiment of the present disclosure a method of reducing air leakage in a power generation system is provided. The method includes positioning at least one self-lubricating brush seal assembly having a plurality of self-lubricating members in contact with a component of the power generation system.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 3 is a bottom partial view of a plurality of self-lubricating members of a self-lubricating brush seal assembly of the present disclosure.

FIG. 4 is a side view of a self-lubricating member of the present disclosure.

FIG. 5 is a bottom view of the self-lubricating member of FIG. 4 of the present disclosure.

FIG. 6 is a cross-sectional view along line 6-6 of FIG. 3 of a self-lubricating member of the present disclosure.

FIG. 7 is a bottom view of the self-lubricating member of FIG. 6 of the present disclosure.

FIG. 8 is a bottom view of a bristle strip containing a self-lubricating member of the present disclosure.

Wherever possible, the same reference numbers will be used throughout the drawings to represent the same parts.

DETAILED DESCRIPTION OF THE INVENTION

Provided is a self-lubricating brush seal assembly, power generation system, and method of reducing leakage in the power generation system that do not suffer from the drawbacks in the prior art.

The power generation system includes, but is not limited to, gas turbines, steam turbines, and other turbines. As used herein, "self-lubricating" refers to a material, powder, coating, or other item that imparts lubricating properties without having to use additional external lubricants like oil, grease, or mist/spray lubrication.

Figure 1:
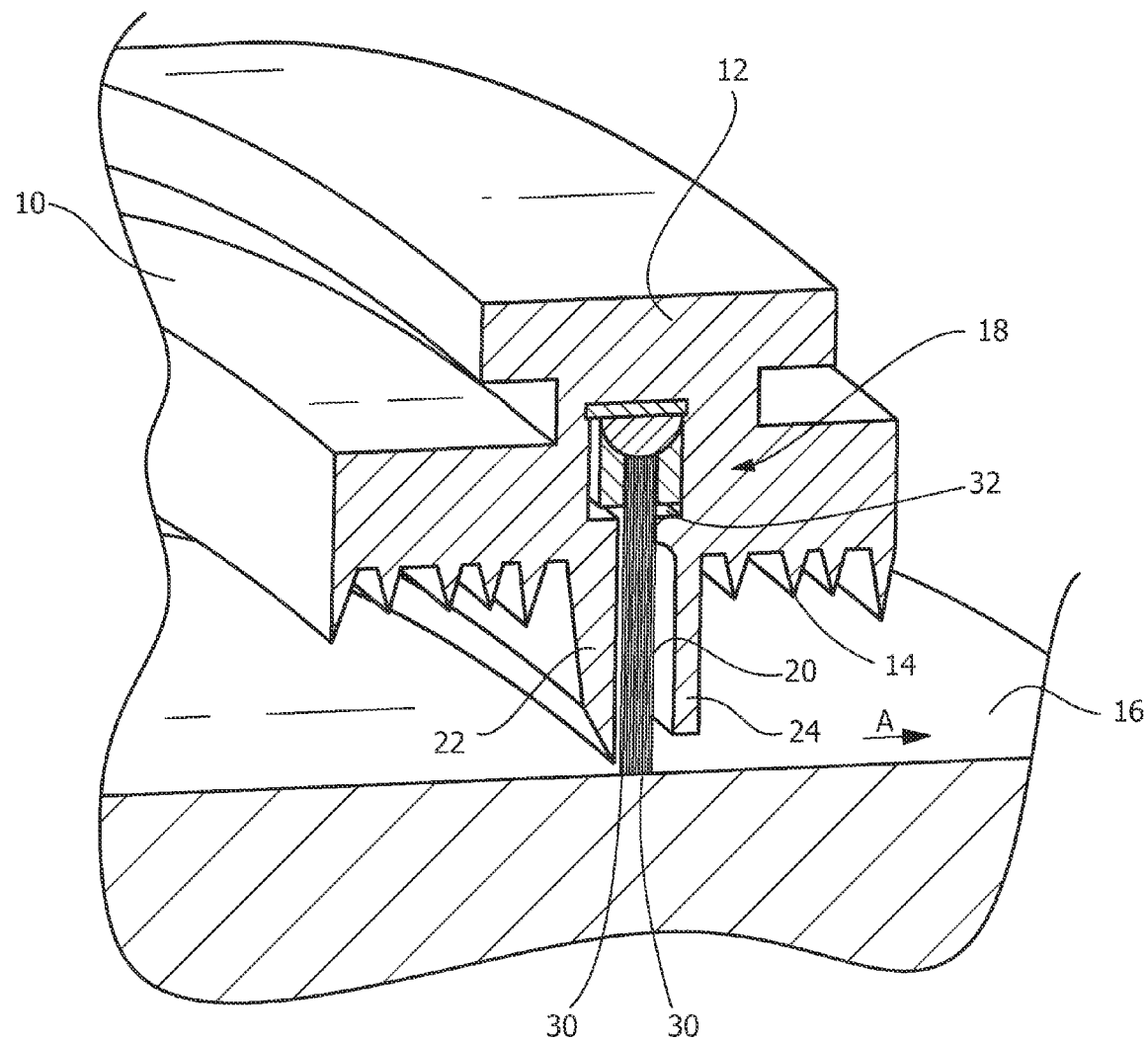
FIG. 1 is a fragmentary perspective view of a packing ring and shaft mounting of a self-lubricating brush seal assembly constructed in accordance with a preferred embodiment of the present disclosure.

As shown in FIGS. 1-8, embodiments of a self-lubricating brush seal assembly 18 comprising a plurality of self-lubricating members 30 are provided. The self-lubricating brush seal assembly of the present disclosure is applicable to turbine engines, such as gas turbine engines or steam turbine engines. Referring to FIG. 1, a packing ring 10 including a dovetail 12 on one side for securement to a stationary component and a plurality of labyrinth teeth 14 on the opposite side for sealing with a rotary component 16 is provided. As illustrated, a self-lubricating brush seal assembly 18 is disposed within a slot of the packing ring 10. In one embodiment, the self-lubricating brush seal assembly 18 includes a plurality of base bristles 20 and a plurality of self-lubricating members 30. The tips of the base bristles 20 and self-lubricating members 30 engage along the surface of the rotary component 16. A pressure or front plate 22 and a fence or back plate 24 are formed on, such as by machining, the packing ring 10 and lie on respective opposite sides of the base bristles 20 and self-lubricating members 30. The base bristles 20 and self-lubricating members 30, as is conventional, are typically angled or canted in the direction of rotation of the rotary component 16 and each bristle forms an acute angle with an intersecting radius of the rotor 16. The packing ring 10 is preferably formed in segments (see FIG. 9) to complete an annular brush seal about the rotary component 16. Set screws, not shown, along the outer diameter of the packing ring 10 may be used to secure the brush seal assembly 18 in the packing ring slot.

Figure 2:
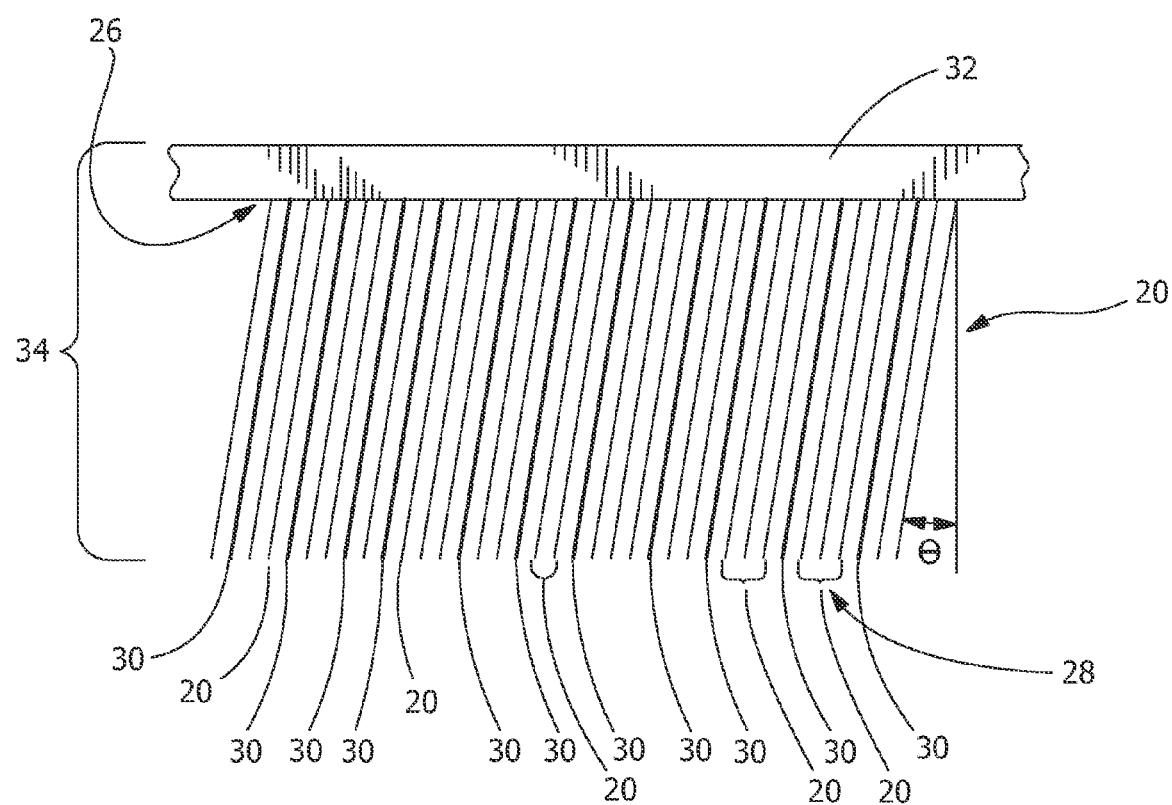
FIG. 2 is a side view of a bristle strip including a bristle pack mounted to a flexible rail of the present disclosure.

FIG. 2 is a side view of a bristle strip 34 including a bristle pack 36 mounted to a flexible rail 16. The base bristles 20 and self-lubricating members 30 are preferably supported on the rails 16 at an angle, e (theta), of about 0-70° to the radial direction ("r"), as shown in FIG. 1. In this manner, the free ends 28 of the base bristles 20 and self-lubricating members 30 are preferably orientated in the direction of rotation of the rotor 16 as indicated by arrow "A" (see FIG. 1), or other moving component of the system. The base bristles 20 and self-lubricating members 30 may preferably be held between the rails 16 by welding, although other methods of attachment may be utilized as would be known to those of skill in the art. In addition, the plurality of base bristles 20 and plurality of self-lubricating members 30 may be secured individually, or in bristle packs 36. The plurality of base bristles 20 are selected from, for example, but not limited to, metals, such as steel alloys, nickel alloys, and/or a high temperature alloys, such as a cobalt-based superalloy, and/or combinations thereof, to help maintain the shape and orientation of the base bristles 20, and to provide wear-resistance. Examples of suitable material for the base bristles 20 are, but not limited to, Haynes® 25 alloy, Haynes®188 alloy, Hastelloy® C-276 alloy, from Haynes International, Inc. (Kokomo, Ind.), or Nitronic 60® from High Performance Alloys (Tipton, Ind.).

After the base bristles 20 and plurality of self-lubricating members 30 are secured to the rails 16, the rails 16 can optionally be machined to pre-determined dimensions. In addition, each rail 16 has a thickness which may be equal to each other, or different. Preferably, the dimensions of the rails 16 are such that bristle strip 34 is substantially flexible, i.e., can be bent readily by hand to fit within the annular holder. The width of the rails 16 is preferably in the range of about 0.05-0.1 inch, and the thickness is in the range of about 0.05-0.01 inch. In one embodiment, the width and thickness of the rails 16 is equal. In addition, the rails 16 may preferably be made of any suitable material, such as, but not limited to, a nickel-based superalloy, such as, but not limited to Inconel® 625 from High Performance Alloys (Tipton, Ind.), which can withstand a high temperature environment, while remaining flexible. The rails 16 may be formed by machining, extruding, or other metal fabrication processes, as would also be known to those of skill in the art.

FIG. 3 is a bottom partial view of the bristle strip 34 including a plurality of base bristles 20 and plurality of self-lubricating members 30 of a self-lubricating brush seal assembly 18. In one embodiment, the base bristles 20, made up of a metallic material and generally having a diameter of approximately 50 microns to approximately 150 microns, or alternatively approximately 60 microns to approximately 125 microns, or alternatively approximately 75 microns to approximately 100 microns. The base bristles 20 are stacked together with the plurality of self-lubricating members 30 to form a ring 10 sandwiched by a front plate 22 and a back plate 24 (see FIG. 1). In one embodiment, the plurality of self-lubricating members 30 are randomly inter-dispersed between the base bristles 20 of the brush pack 36. In another embodiment, the self-lubricating members 30 are provided as a row 38 or plurality of rows 38 amongst the base bristles 20. In another embodiment, the self-lubricating members 30 are randomly inter-dispersed between the base bristles 20, such that approximately one in ten of the bristles, or alternatively one in eight of the bristles, or alternatively one in five of the bristles, in the self-lubricating assembly 18 is a self-lubricating member 30. In yet another embodiment, the self-lubricating members 30 occupy approximately 5 to approximately 30 percent by volume, or alternatively 10 to approximately 25 percent by volume, or alternatively approximately 15 to approximately 20 percent by volume, of the total number of bristles in bristle pack 36 of the self-lubricating bristle assembly 18. In one embodiment, the plurality of self-lubricating members 30 are selected from a plurality of self-lubricating bristles 42 comprising graphite, carbon nano-fiber bundles, and combinations thereof. The self-lubricating bristles 42 are constructed such that the self-lubricating bristles 42 are approximately the same size as the base bristles 20 in the bristle pack 36.

As shown in FIGS. 4 and 5, in one embodiment, the self-lubricating member 30, a self-lubricating bristle 50, is constructed from a core 52, such as, for example, but not limited to, a wire, surrounded by a self-lubricating braid 54. In one embodiment, the bristle pack 36 is comprised of all self-lubricating bristles 50. In another embodiment, the bristle pack 36 is comprised of a plurality of self-lubricating bristles 50 and a plurality of core bristles 20, such that approximately occupy approximately 5 to approximately 30 percent by volume, or alternatively 10 to approximately 25 percent by volume, or alternatively approximately 15 to approximately 20 percent by volume, of the total number of bristles in the bristle pack 36 are self-lubricating bristles 50. The self-lubricating braid 54 of the self-lubricating bristle 50 surrounds the core 52. The self-lubricating braid 54 is applied to the core 52 as a sheath to form the self-lubricating bristle 50. The core 52 is selected from, for example, but not limited to, metals, such as steel alloys, nickel alloys, and/or a high temperature alloys, such as a cobalt-based superalloy, and/or combinations thereof. The self-lubricating braid 54 comprises graphite, carbon nano-fiber, and combinations thereof. In one embodiment, the carbon nano-fibers are approximately 30 nanometers to approximately 200 nanometers in diameter. In one embodiment, the carbon nano-fibers comprising the self-lubricating braid are applied by electro-spinning the carbon nano-fibers around the core 52 in the bristle pack 36 or into braids that are applied as sheaths to the core 52. In one embodiment the self-lubricating braids 54 surrounding the core 52 comprise approximately 5 to approximately 30 percent by volume, or alternatively 10 to approximately 25 percent by volume, or alternatively approximately 15 to approximately 20 percent by volume, of the total number of total volume of the self-lubricating bristle 50.

As shown in FIGS. 6 and 7, in one embodiment, the self-lubricating member 30, a self-lubricating bristle 60, is constructed from a core 52 coated with self-lubricating material 62. FIG. 6 is a cross-sectional view along line 6-6 of FIG. 3 of a self-lubricating member 30, a self-lubricating bristle 60. FIG. 7 provides a bottom view of the self-lubricating bristle 60, showing that the self-lubricating material 62 completely surrounds the outer diameter 56 of the core 52. In one embodiment, the self-lubricating material 62 is graphite, molybdenum disulfide ($MoS_2$), tungsten disulfide ($WS_2$), and combinations thereof. In yet another embodiment, chemical vapor deposition (CVD) is used to coat the self-lubricating material 62 on the core 52 to form the self-lubricating bristle 60. Suitable examples of the self-lubricating material 62 include ceramic coatings, such as but not limited to, titanium nitride (TiN), titanium aluminum nitride (TiAlN), and titanium carbonitride (TiCN). In one embodiment, the self-lubricating material 62 is introduced to the outer diameter 56 of the core 52 by a billet or rod of lubricating material positioned next to the core 52 during the final drawing die, such that the self-lubricating material 62 is completely surrounds the outer diameter 56 of the core 52 to form the self-lubricating bristle 60. In another embodiment, to form the self-lubricating bristles 60, the cores 52 are spooled through a Physical vapor deposition (PVD) chamber and with rectangular sputtering target where self-lubricating material 62 is sputtered on to the moving core 52 at a temperature of 200 to 300° C. In yet another embodiment, chemical vapor deposition (CVD) is used to coat the self-lubricating material 62 on the core 52 to form the self-lubricating bristle 60. In one embodiment, the self-lubricating material 62 comprises approximately 10 to approximately 30 percent by volume, or alternatively approximately 15 to approximately 25 percent by volume, or alternatively 17 to approximately 23 percent by volume, of the total volume of the self-lubricating bristle 60.

Figure 9:
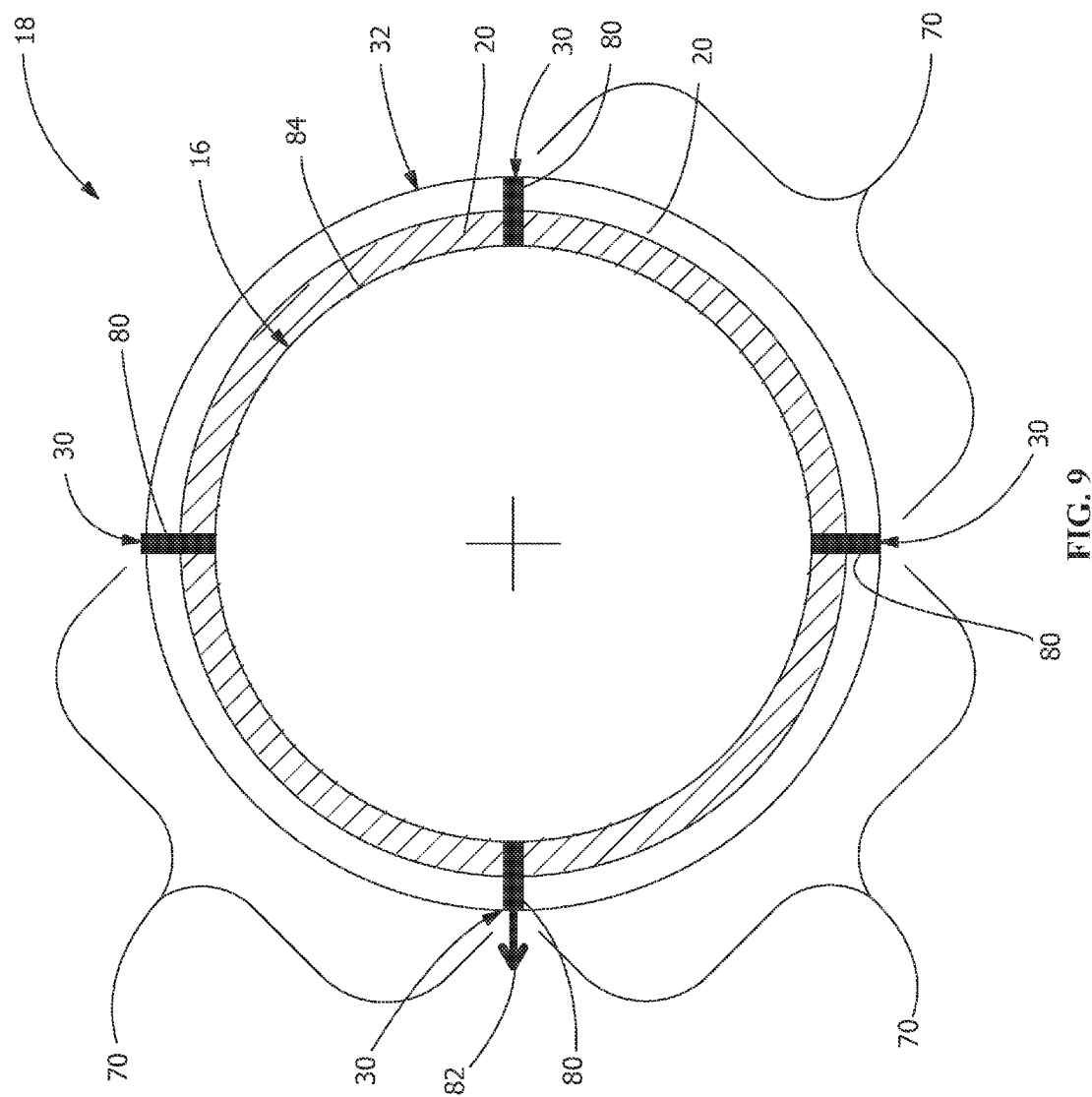
FIG. 9 is a schematic of the brush seal assembly and brush seal segments including a self-lubricating member surrounding a rotor of the present disclosure.

As shown in FIGS. 8 and 9, another embodiment of a self-lubricating brush seal assembly 18 is provided. The self-lubricating brush seal assembly 18 includes a plurality of brush seal segments 70 further including rails 32 to hold the brush pack 36 and self-lubricating members 30 together. As shown in FIG. 8, the brush pack 36 includes a plurality of base bristles 20 adjacent to at least one self-lubricating member 30 located on at least one of the brush seal assembly 18. In another embodiment, the self-lubricating member 30 is detachably attached (for example, removable in the direction shown by arrow labeled 82) to the brush seal assembly 18 for easy replacement of the self-lubricating member 30 to increase the life of the base bristles 20 (see FIG. 9). As shown in FIG. 9, the self-lubricating brush seal assembly 18 includes a plurality of segments 70 having a plurality of self-lubricating members 30. In one embodiment, the at least one self-lubricating member 30 is a lubricating pack 80. In one embodiment, the lubricating pack 80 is disposed on at least one end of the plurality of segments 70 of the brush seal assembly 18. In another embodiment, the lubricating pack 80 is attached to at least one end or detachably attached to at least one of the segments 70 of the brush seal assembly 18 using any suitable attachment means, such as, but not limited to, welding, attaching by fastening means, providing a groove in the brush seal assembly 18 to hold the lubricating pack 80, or any other suitable means. As shown in FIG. 9, the lubricating packs 80 are typically placed at the end of each brush seal segment 70 in such a way that the rotor 16, under circumferential motion, would transfer solid lubricants from the lubricating pack 80 and smear it between the contacting base bristles 20 and the rotor surface 84. The lubricating packs 80 reduce friction and wear of the rotor surface 84 and base bristles 20.

The lubricating pack 80 includes an environmentally stable (oxidation resistant) metallic matrix including metallic powders or particles and lubricating powders or particles. In one embodiment, the metallic powders or particles of the metallic matrix, include, but are not limited to, NiCr, CoCr, NiCoCr. The metallic powders or particles are formed into a porous powder metallurgy preform, or green compact, that includes the desired dimensions of the lubricating pack 80. The green compact powder preform is then sintered at a temperature of approximately 50% to approximately 70% of the melting point in Kelvin of the metallic powders or particles. After the preform is sintered, lubricating powders or particles such as but not limited to, $WS_2$, $MoS_2$ hBN, and combinations thereof are vacuum impregnated into the preform using any suitable technique, such as but not limited to, including the lubricating powders or particles in an organic medium to produce a slurry. In one embodiment, the lubricating particles comprise approximately 40% to approximately 60% by weight, or alternatively approximately 42% to approximately 58% by weight, or alternatively approximately 45% to approximately 55% by weight of the final metallic matrix. In another embodiment, the lubricating pack 80 is constructed by blending the metallic powders or particles and the lubricating powders or particles. The blended metallic powders or particles and lubricating powders or particles are then compacted into a preform and then sintered at a temperature that is less than the decomposition temperature of the lubricating powders or particles used.

The lubricating packs 80 contact a component, such as a rotor 16 (FIG. 1) in a power generation system. Generally the dimensions of the lubricating packs 80 are such that the lubricating packs 80 fit within existing brush seal assemblies and the lubricating packs 80 have the same length as base bristles 20. In another embodiment, the lubricating pack 80 is formed from a plurality of self-lubricating bristles 42, 50 or 60 formed together as a pack.

In one embodiment, to maximize performance of the power generation system, the self-lubricating brush seal assembly 18 is located at the inter-stage of both the high and low pressure sections, and end packings of the power generation system to prevent end leakage.

One advantage of an embodiment of the present disclosure includes a brush seal assembly that enables span reduction.

Another advantage of an embodiment of the present disclosure includes a brush seal assembly that provides sustained turbine performance.

Another advantage of an embodiment of the present disclosure includes an improved seal design that is a cost-effective way to increase performance by limiting secondary leakage.

Another advantage of an embodiment of the present disclosure is the lubricating phase provided by the self-lubricating members reduces the coefficient of friction.

Yet another advantage of an embodiment of the present disclosure is that the lubricating phase provided by the self-lubricating members mitigates thermal imbalances in the rotor of the turbine.

Another advantage of an embodiment of the present disclosure is that the self-lubricating brush seal assembly can be used as a replacement brush seal assembly in turbines.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A self-lubricating brush seal assembly comprising a plurality of self-lubricating members; and a plurality of metallic base bristles, the metallic base bristles consisting essentially of metal;
   wherein the plurality of self-lubricating members are selected from a plurality of cores sheathed in a self-lubricating braid and the self-lubricating bristles occupy approximately 5 to approximately 30 percent by volume of the total number of bristles in the self-lubricating brush seal assembly.

2. The self-lubricating brush seal assembly of claim 1, wherein the plurality of self-lubricating members are selected from a plurality of self-lubricating bristles comprising graphite, carbon nano-fiber, and combinations thereof.

3. The self-lubricating brush seal assembly of claim 1, wherein the self-lubricating braid comprises graphite, carbon nano-fiber, and combinations thereof.

4. The self-lubricating brush seal assembly of claim 1, wherein the plurality of self-lubricating members include a plurality of cores having an outer diameter coated with self-lubricating material.

5. The self-lubricating brush seal assembly of claim 4, wherein the self-lubricating material is selected from graphite, hexagonal-boron nitrite (hBN), molybdenum disulfide ($MoS_2$), tungsten disulfide ($WS_2$), titanium nitride (TiN), titanium aluminum nitride (TiAlN), titanium carbonitride (TiCN), and combinations thereof.

6. The self-lubricating brush seal assembly of claim 1, wherein the self-lubricating brush seal assembly includes a plurality of segments, wherein the plurality of self-lubricating members include at least one lubricating pack disposed on at least one end of the plurality of segments of the brush seal assembly.

7. The self-lubricating brush seal assembly of claim 6, wherein the lubricating pack includes a metal matrix and a plurality of lubricating particles, wherein the plurality of lubricating particles are selected from graphite, hexagonal-boron nitrite (hBN), molybdenum disulfide ($MoS_2$), tungsten disulfide ($WS_2$), and combinations thereof.

8. The self-lubricating brush seal assembly of claim 6, wherein the lubricating pack is disposed on an exterior portion of at least one of plurality of segments of the brush seal assembly.

9. A power generation system comprising a self-lubricating brush seal assembly in contact with a rotor of the power generation system, the self-lubricating brush seal assembly having a plurality of self-lubricating members; and a plurality of metallic base bristles, the metallic base bristles consisting essentially of metal;
wherein the plurality of self-lubricating members are selected from a plurality of cores sheathed in a self-lubricating braid and the self-lubricating bristles occupy approximately 5 to approximately 30 percent by volume of the total number of bristles in the self-lubricating brush seal assembly.

10. The power generation system of claim 9, wherein the plurality of self-lubricating members are selected from a plurality of self-lubricating bristles comprising graphite, carbon nano-fiber, and combinations thereof.

11. The power generation system of claim 9, wherein the self-lubricating braid comprises graphite, carbon nano-fiber, and combinations thereof material.

12. The power generation system of claim 9, wherein each of the plurality of self-lubricating members include a core having an outer diameter coated with a self-lubricating material, wherein the self-lubricating material is selected from graphite, hexagonal-boron nitrite (hBN), molybdenum disulfide (MoS2), tungsten, disulfide (WS2), and combinations thereof.

13. The power generation system of claim 9, wherein the self-lubricating brush seal assembly includes a plurality of segments, wherein the plurality of self-lubricating members include at least one lubricating pack disposed on at least one end at least one of the plurality of segments of the brush seal assembly, wherein the at least one lubricating pack includes a metal matrix and a plurality of lubricating particles, wherein the plurality of lubricating particles are selected from graphite, hexagonal-boron nitrite (hBN), molybdenum disulfide ($MoS_2$), tungsten disulfide ($WS_2$), and combinations thereof.

14. The power generation system of claim 13, wherein the lubricating pack is disposed on an exterior portion of at least one of the plurality of segments of the brush seal assembly.

15. A method of reducing air leakage in a power generation system comprising positioning at least one self-lubricating brush seal assembly having a plurality of self-lubricating members in contact with a component of the power generation system.

16. The method of claim 15, wherein the plurality of self-lubricating members are selected from a plurality of self-lubricating bristles comprising graphite, carbon nano-fiber, and combinations thereof.

17. The method of claim 15, wherein the plurality of self-lubricating members are selected from:
a plurality cores sheathed in a self-lubricating braid, wherein the self-lubricating braid comprises graphite, carbon nano-fiber, and combinations thereof;
a plurality of cores having an outer diameter coated with a self-lubricating material, wherein the self-lubricating material is selected from graphite, hexagonal-boron nitrite (hBN), molybdenum disulfide (MoS2), tungsten, disulfide (WS2), and combinations thereof.

18. The method of claim 14, wherein the self-lubricating brush seal assembly includes a plurality of segments, wherein the self-lubricating member includes a lubricating pack disposed on at least one end at least one of the plurality of segments of the brush seal assembly, wherein the lubricating pack includes a metal matrix and a plurality of lubricating particles, wherein the plurality of lubricating particles are selected from graphite, hexagonal-boron nitrite (hBN), molybdenum disulfide ($MoS_2$), tungsten disulfide ($WS_2$), and combinations thereof.

19. The method of claim 14, wherein the component of the power generation system is selected from rotating and non-rotating parts.

* * * * *